(12) United States Patent
Choi et al.

(10) Patent No.: US 9,369,239 B2
(45) Date of Patent: Jun. 14, 2016

(54) METHOD AND APPARATUS FOR TRANSMITTING ACKNOWLEDGMENTS IN WIRELESS COMMUNICATION SYSTEMS

(71) Applicant: LG Electronics Inc., Seoul (KR)

(72) Inventors: Hyeyoung Choi, Anyang-si (KR); Hyunsoo Ko, Anyang-si (KR); Jaehoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/378,521

(22) PCT Filed: Feb. 18, 2013

(86) PCT No.: PCT/KR2013/001237
§ 371 (c)(1),
(2) Date: Aug. 13, 2014

(87) PCT Pub. No.: WO2013/122434
PCT Pub. Date: Aug. 22, 2013

(65) Prior Publication Data
US 2015/0117337 A1  Apr. 30, 2015

Related U.S. Application Data

(60) Provisional application No. 61/600,683, filed on Feb. 19, 2012.

(51) Int. Cl.
*H04L 1/16* (2006.01)
*H04L 1/18* (2006.01)
(52) U.S. Cl.
CPC ............ *H04L 1/1657* (2013.01); *H04L 1/1825* (2013.01); *H04L 1/1854* (2013.01)

(58) Field of Classification Search
CPC ........... H04W 72/042; H04W 72/0413; H04L 5/0091; H04L 5/0053; H04L 1/1896; H04L 5/0007; H04L 5/001; H04L 5/0098; H04L 5/0023; H04L 5/0035; H04L 5/0082; H04L 5/0057
See application file for complete search history.

(56) References Cited

U.S. PATENT DOCUMENTS

| 8,423,856 | B2 * | 4/2013 | Cai ....................... | H04L 1/1896 370/329 |
| 2010/0151874 | A1 * | 6/2010 | Cai ....................... | H04W 76/06 455/452.1 |
| 2010/0303036 | A1 * | 12/2010 | McBeath .............. | H04L 5/0005 370/329 |
| 2010/0323709 | A1 * | 12/2010 | Nam ...................... | H04B 7/043 455/450 |
| 2011/0035639 | A1 * | 2/2011 | Earnshaw ............. | H04L 1/1812 714/748 |
| 2011/0164584 | A1 * | 7/2011 | Seo ...................... | H04W 72/042 370/329 |

(Continued)

FOREIGN PATENT DOCUMENTS

| KR | 10-2011-0069735 A | 6/2011 |
| KR | 10-2012-0010099 A | 2/2012 |

(Continued)

*Primary Examiner* — Jung-Jen Liu
(74) *Attorney, Agent, or Firm* — Dentons US LLP

(57) ABSTRACT

The present invention relates to a method for receiving control information on a terminal in a wireless communication system, including the steps of: transmitting uplink data to a base station through a physical uplink shared channel; and receiving a downlink control information (DCI) format related to an uplink approval, wherein, when the DCI format meets predetermined conditions, the terminal considers the DCI format as an acknowledgement for the uplink data.

8 Claims, 10 Drawing Sheets

(56) References Cited

U.S. PATENT DOCUMENTS

| | | | | |
|---|---|---|---|---|
| 2011/0194523 A1* | 8/2011 | Chung | H04L 5/0053 | 370/329 |
| 2011/0223924 A1* | 9/2011 | Lohr | H04W 72/042 | 455/450 |
| 2011/0239072 A1* | 9/2011 | Cai | H04L 1/1896 | 714/748 |
| 2012/0113946 A1* | 5/2012 | Seo | H04L 1/1812 | 370/329 |
| 2013/0010709 A1* | 1/2013 | Earnshaw | H04L 5/001 | 370/329 |
| 2013/0010720 A1* | 1/2013 | Lohr | H04L 1/0026 | 370/329 |
| 2013/0039202 A1* | 2/2013 | Feuersanger | H04L 5/001 | 370/252 |
| 2013/0039297 A1* | 2/2013 | Wang | H04W 76/045 | 370/329 |
| 2013/0114573 A1* | 5/2013 | Suzuki | H04L 1/1887 | 370/336 |
| 2013/0176952 A1* | 7/2013 | Shin | H04L 5/001 | 370/329 |
| 2014/0321406 A1* | 10/2014 | Marinier | H04B 7/024 | 370/329 |

FOREIGN PATENT DOCUMENTS

| | | |
|---|---|---|
| WO | 2011-054188 A1 | 5/2011 |
| WO | 2011-084014 A2 | 7/2011 |
| WO | 2011-143586 A1 | 11/2011 |

* cited by examiner

METHOD AND APPARATUS FOR TRANSMITTING ACKNOWLEDGMENTS IN WIRELESS COMMUNICATION SYSTEMS

TECHNICAL FIELD

The following explanation relates to a method of transmitting a reception confirmation response in a wireless communication system and an apparatus therefor.

BACKGROUND ART

A wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system, MC-FDMA (multi carrier frequency division multiple access) system and the like.

DISCLOSURE OF THE INVENTION

Technical Task

A technical task of the present invention relates to methods capable of transmitting a reception confirmation response for uplink data transmission without transmitting a physical HARQ (hybrid automatic retransmit request) indicator channel.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to a first technical aspect of the present invention, a method of receiving control information, which is received by a user equipment in a wireless communication system, includes the steps of transmitting an uplink data to an eNode B via a physical uplink shared channel and receiving a downlink control information (DCI) format related to an uplink grant, wherein if the DCI format satisfies a prescribed condition, the user equipment considers the DCI format as a reception confirmation response of the uplink data.

To further achieve these and other advantages and in accordance with the purpose of the present invention, according to a second technical aspect of the present invention, a user equipment device in a wireless communication system includes a reception module and a processor, the processor configured to transmit an uplink data to an eNode B via a physical uplink shared channel, the processor configured to receive a downlink control information (DCI) format related to an uplink grant, wherein if the DCI format satisfies a prescribed condition, the user equipment considers the DCI format as a reception confirmation response of the uplink data.

The first to the second technical aspect of the present invention can include all or a part of items in the following.

The prescribed condition may correspond to a transport block for uplink transmission disabled in the DCI format.

The prescribed condition may correspond to values of one or more field of the DCI format matched with a predetermined value.

The prescribed condition may correspond to an NDI (new data indicator) set to 1.

If the DCI format satisfies the prescribed condition and an NDI (new data indicator) is not toggled, the user equipment can retransmit the uplink data.

If the DCI format satisfies the prescribed condition and an NDI (new data indicator) is not toggled, the user equipment can further receive the DCI format to retransmit the uplink data.

If the DCI format satisfies the prescribed condition and an NDI (new data indicator) is toggled, the user equipment can flush a buffer related to the uplink data.

If the DCI format satisfies the prescribed condition, the user equipment does not perform transmission transmitted by a resource block allocation field of the DCI format.

The one or more fields can include a transmit power control command field, a demodulation reference signal cyclic shift field and a modulation and coding-related field.

The DCI format may be descrambled by an SPS (semi persistence scheduling)-RNTI.

Whether to retransmit the uplink data can be determined according to one of predetermined values matched with the one or more field values of the DCI format.

The user equipment can descramble the DCI format with a prescribed RNTI in a subframe followed by 4 subframes from a subframe in which the uplink data is transmitted.

The eNode B does may not transmit a physical HARQ (hybrid automatic retransmit request) indicator channel.

Advantageous Effects

According to the present invention, it is able to transmit a reception confirmation response for uplink data transmission while maximizing resource utilization.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

Figure 1:
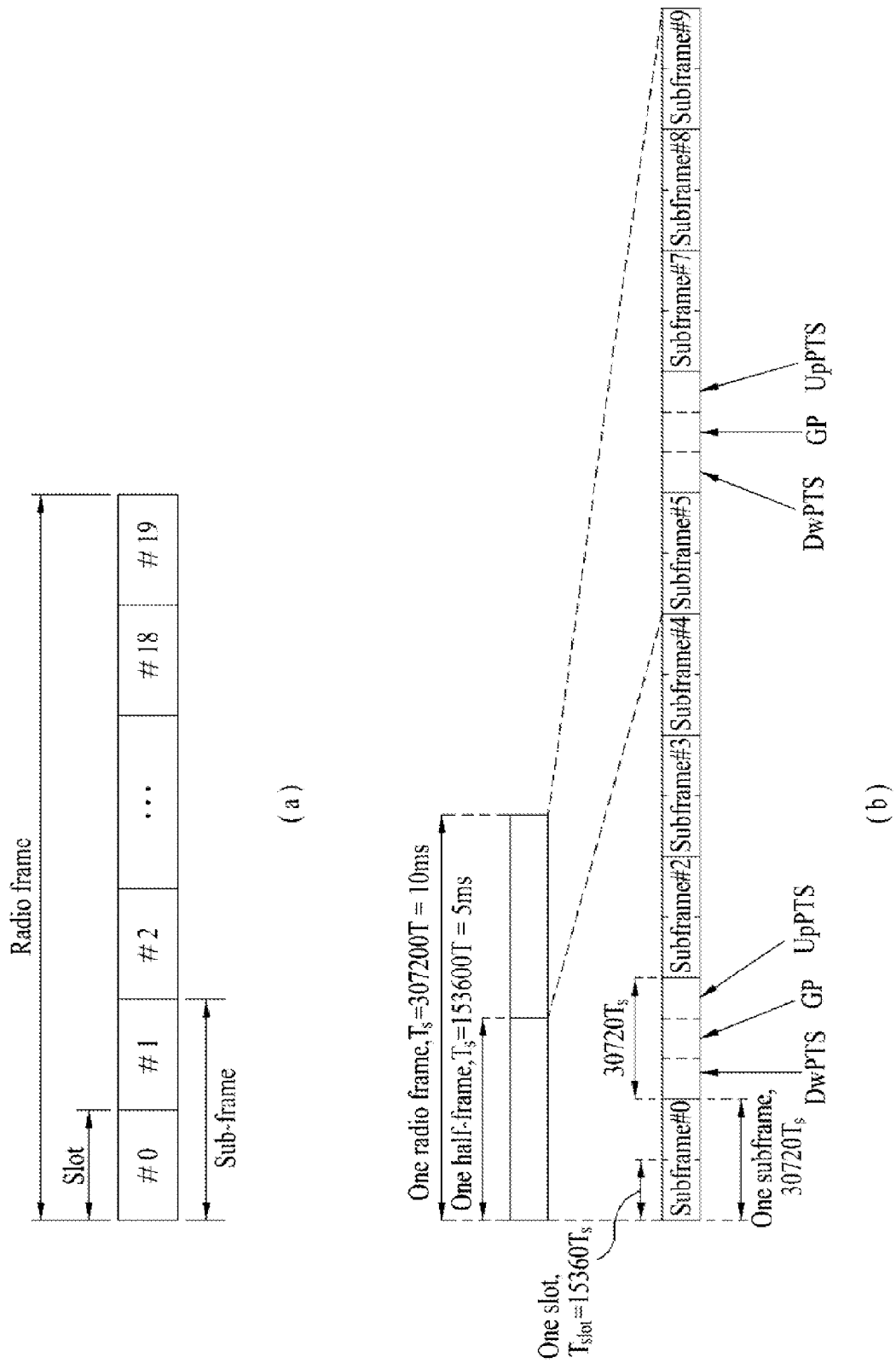
FIG. 1 is a diagram for explaining a structure of a downlink radio frame.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

In this specification, embodiments of the present invention are described centering on the data transmission/reception relations between an eNode B and a user equipment. In this case, an eNode B has a meaning of a terminal node of a network directly communicating with a user equipment. In this disclosure, a specific operation explained as performed by an eNode B may be performed by an upper node of the eNode B in some cases.

In particular, in a network constructed with a plurality of network nodes including an eNode B, it is apparent that various operations performed for communication with a user equipment can be performed by an eNode B or other network nodes except the eNode B. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), or the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

FIG. 1 is a diagram for explaining a structure of a downlink radio frame. Referring to FIG. 1 (*a*), one radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain. Since 3GPP LTE system uses OFDMA in downlink, OFDM symbol is provided to indicate one symbol period. The OFDM symbol may be named SC-FDMA symbol or symbol period in uplink. Resource block (RB) is a resource allocation unit and may include a plurality of contiguous subcarriers in one slot. The above-described structures of the radio frame are exemplary only. Hence, the number of subframes included in a radio frame, the number of slots included in the subframe and the number of OFDM symbols included in the slot may be modified in various ways.

FIG. 1 (*b*) is a diagram for a structure of a type 2 radio frame. The type 2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in an eNode B and uplink transmission synchronization of a user equipment. The guard period is a period for eliminating interference generated in uplink due to multipath delay of a downlink signal between uplink and downlink.

In this case, the structures of the radio frame are exemplary only. And, the number of subframes included in a radio frame, the number of slots included in the subframe and the number of symbols included in the slot may be modified in various ways.

Figure 2:
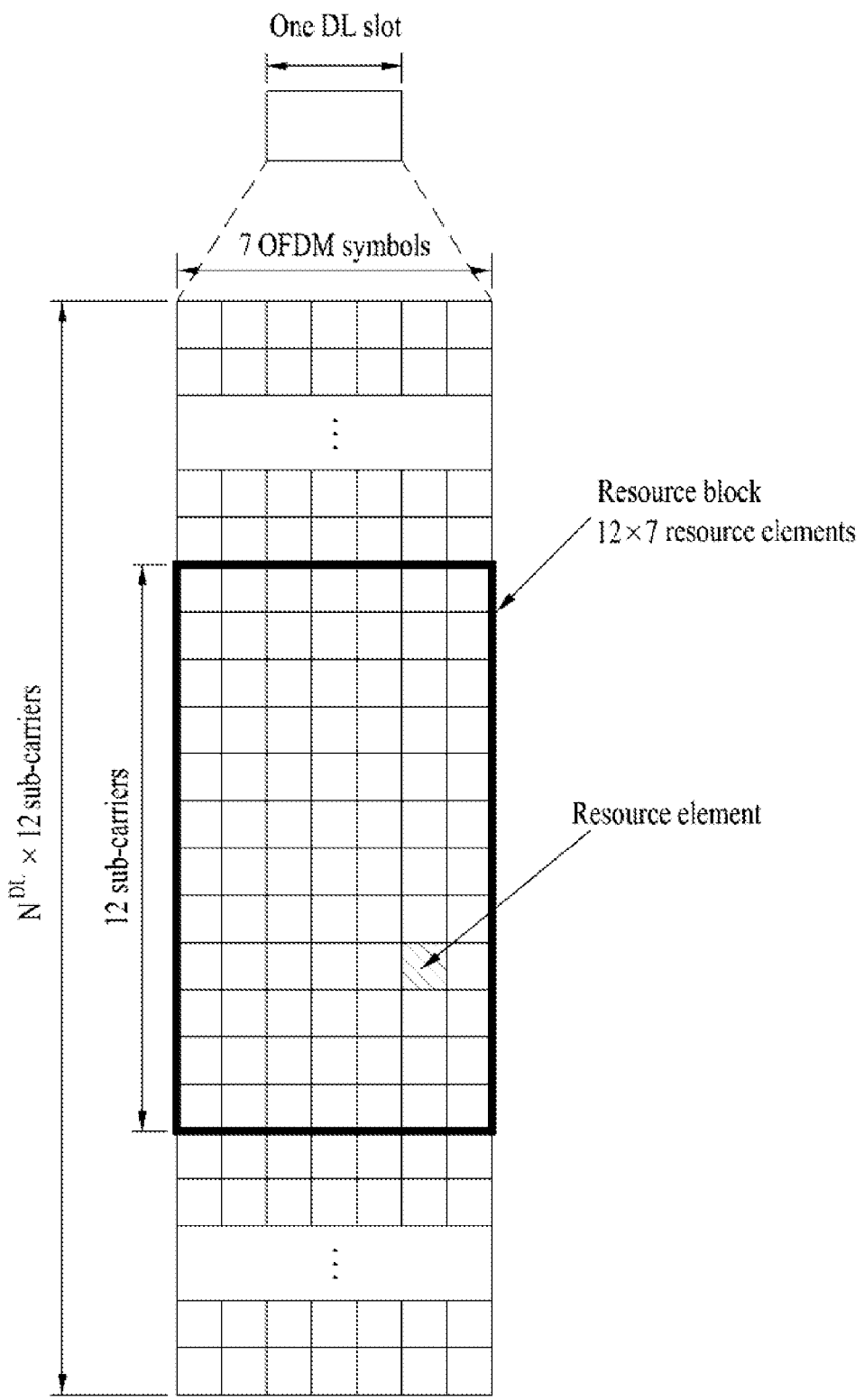
FIG. 2 is a diagram for an example of a resource grid for a downlink (DL) slot.

FIG. 2 is a diagram for an example of a resource grid for a downlink (DL) slot. Referring to FIG. 2, one downlink (DL) slot includes 7 OFDM symbols and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
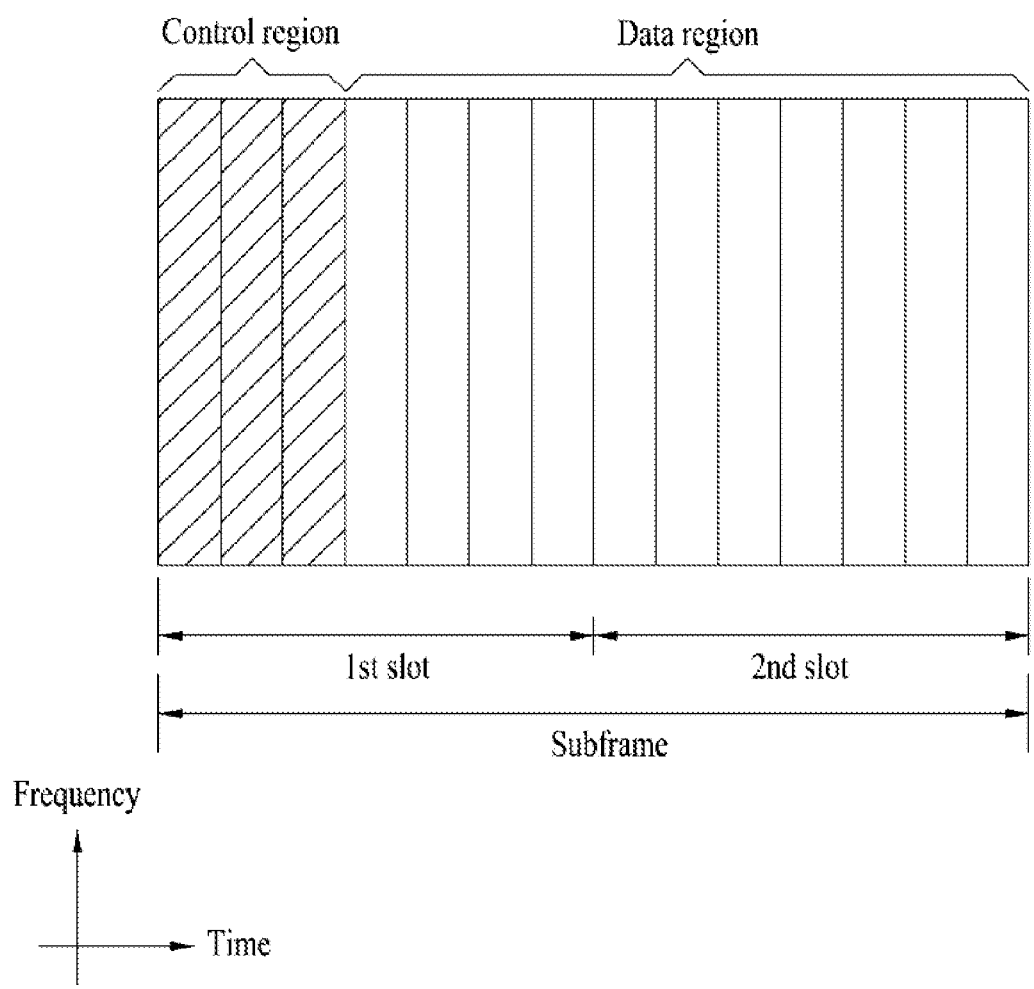
FIG. 3 a diagram for a structure of a downlink (DL) subframe.

FIG. 3 a diagram for a structure of a downlink (DL) subframe. Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by LTE system may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and includes information on the number of OFDM symbols used for a transmission of a control channel within the subframe.

The PHICH is a response channel in response to UL transmission and includes an ACK/NACK signal.

Control information carried on PDCCH may be called downlink control information (hereinafter abbreviated DCI). The DCI may include UL scheduling information, DL scheduling information or a UL transmit (Tx) power control command for a random UE (user equipment) group. PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Figure 4:
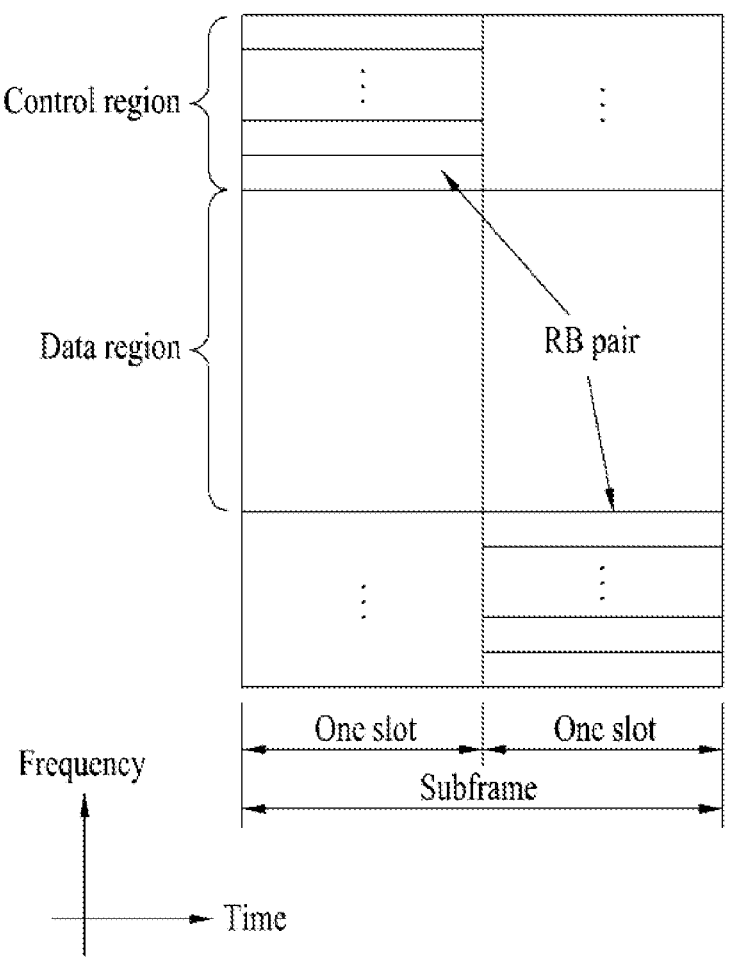
FIG. 4 is a diagram for a structure of an uplink (UL) subframe.

FIG. 4 is a diagram for a structure of an uplink (UL) subframe. Referring to FIG. 4, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

DCI Format

According to a current LTE-A (release 10), DCI format 0, 1, 1A, 1B, 1C, 1D, 2, 2A, 2B, 2C, 3, 3A, and 4 are defined. In this case, the DCI format 0, 1A, 3, and 3A are regulated to have an identical message size to reduce the numbers of blind decoding, which shall be described later. The DCI formats can be classified into i) DCI format 0 and 4 used for UL scheduling grant, ii) DCI format 1, 1A, 1B, 1C, 1D, 2, 2A, 2B, 2C used for DL scheduling assignment, and DCI format 3 and 3A used for a power control command according to a usage of control information to be transmitted.

In case of the DCI format 0 used for UL scheduling grant, the DCI format 0 can include a carrier offset (carrier indicator) necessary in relation to a carrier aggregation, which is described later, an offset (flag for format 0/format 1A differentiation) used for distinguishing the DCI format 0 from the DCI format 1, a hopping flag (frequency hopping flag) informing of whether a frequency hopping is used in an UL PUSCH transmission, information on resource block assignment, which should be used by a UE to transmit PUSCH, a modulation and coding scheme, a new data offset (a new data indicator) used to empty a buffer for an initial transmission in relation to a HARQ process, a transmit power control command for PUSCH (TPC command for scheduled for PUSCH), cyclic shift information (cyclic shift for DM RS and OCC index) for DMRS (demodulation reference signal), an UL index necessary for performing a TDD operation, channel quality information (channel quality indicator) request information (CSI request), and the like. Meanwhile, since the DCI format 0 uses synchronous HARQ, the DCI format 0 does not include a redundancy version as like DCI formats related to DL scheduling assignment do. The carrier offset is not included in the DCI format if the cross carrier scheduling is not used.

The DCI format 4 is newly added to LTE-A release 10. The DCI format 4 is defined to support that a spatial multiplexing is applied to a UL transmission. Compared to the DCI format 0, since the DCI format 4 further includes informations for the spatial multiplexing, the DCI format 4 has a bigger message size and further includes additional control information in addition to the control information included in the DCI format 0. In particular, the DCI format 4 further includes a modulation and coding scheme for a second transmission block, precoding information for a multi antenna transmission, and sounding reference signal (SRS) request information. Meanwhile, since the DCI format 4 has a size greater than the DCI format 0, the DCI format 4 does not include an offset to distinguish the DCI format 0 from the DCI format 1A.

The DCI format 1, 1A, 1B, 1C, 1D, 2, 2A, 2B, 2C related to a DL scheduling assignment can be mainly divided into 1, 1A, 1B, 1C, and 1D not supporting a spatial multiplexing and 2, 2A, 2B, and 2C supporting the spatial multiplexing.

The DCI format 1C is used for a compact DL assignment and supports a frequency consecutive assignment only. Unlike the other formats, the DCI format 1C does not include a carrier offset and a redundancy version.

The DCI format 1A is a format used for a DL scheduling and a random access procedure. The DCI format 1A can include a carrier offset, an indicator indicating whether a DL distributed transmission is used, PDSCH resource allocation information, a modulation and coding scheme, a redundancy version, a HARQ processor number configured to inform of a processor used for a soft combining, a new data offset used to empty a buffer for an initial transmission in relation to a HARQ process, a transmit power control command for PUCCH, a UL index needed for a TDD operation, and the like.

In case of the DCI format 1, most of control information is similar to that of the DCI format 1A. Yet, while the DCI format 1A is related to a consecutive resource allocation, the DCI format 1 supports a non-consecutive resource allocation. Hence, since the DCI format 1 further includes a resource allocation header, a control signaling overhead may increase a little as a tradeoff for an increase of resource allocation flexibility.

When the DCI format 1B and 1D are compared with the DCI format 1, there exists something in common in that they further include precoding information. The DCI format 1B and the DCI format 1D include PMI confirmation and DL power offset information, respectively. The other control information included in the DCI format 1B and 1D is mostly matched with that of the DCI format 1A.

The DCI format 2, 2A, 2B, and 2C basically include most of the control informations included in the DCI format 1A and further include informations used for a spatial multiplexing. The informations used for the spatial multiplexing correspond to a modulation and coding scheme for a second transmission block, a new data offset, and a redundancy version.

The DCI format 2 supports a closed-loop spatial multiplexing and the DCI format 2A supports an open-loop spatial multiplexing. Both the DCI format 2 and the DCI format 2A include precoding information. The DCI format 2B supports a dual-layer spatial multiplexing combined with a beamforming and further includes cyclic shift information for a DMRS. The DCI format 2C can be understood as an extended version of the DCI format 2B and supports a spatial multiplexing up to eight layers.

The DCI format 3 and 3A can be used to supplement the transmit power control information, which is included in the aforementioned DCI formats configured to perform UL scheduling grant and DL scheduling assignment. In particular, the DCI format 3 and 3A can be used to support a semi-persistent scheduling. In case of the DCI format 3, a command of 1 bit-long is used per UE. In case of the DCI format 3A, a command of 2-bit long is used per UE.

Among the aforementioned DCI formats, a prescribed DCI format is transmitted on PDCCH and a plurality of PDCCHs can be transmitted within a control region. A UE can monitor a plurality of the PDCCHs.

Configuration of Downlink (DL) Control Channel

Basically, first three OFDM symbols of each subframe can be used for a region to which a DL control channel is transmitted and 1 to 3 OFDM symbols can be used depending on an overhead of the DL control channel. In order to control the number of OFDM symbols used for a DL control channel according to each subframe, PCFICH may be used. The PCFICH can be used to provide a confirmation response (positive confirmation response (ACK)/negative confirmation response (NACK)) for UL transmission. And, in order to transmit control information for a DL data transmission or a UL data transmission, PDCCH may be used.

Figure 5:
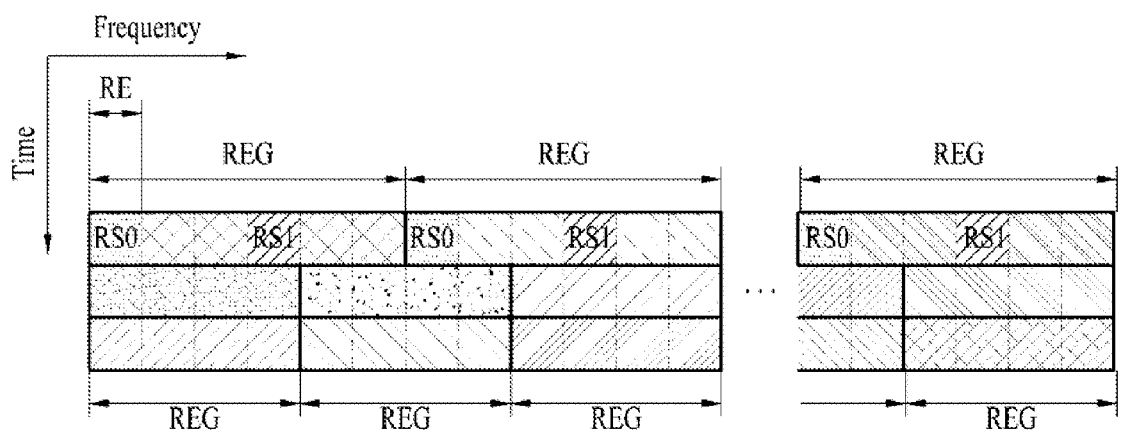
FIG. 5 and FIG. 6 are diagrams for a resource element group (REG) corresponding to a unit to which downlink control channels are assigned.
Figure 6:
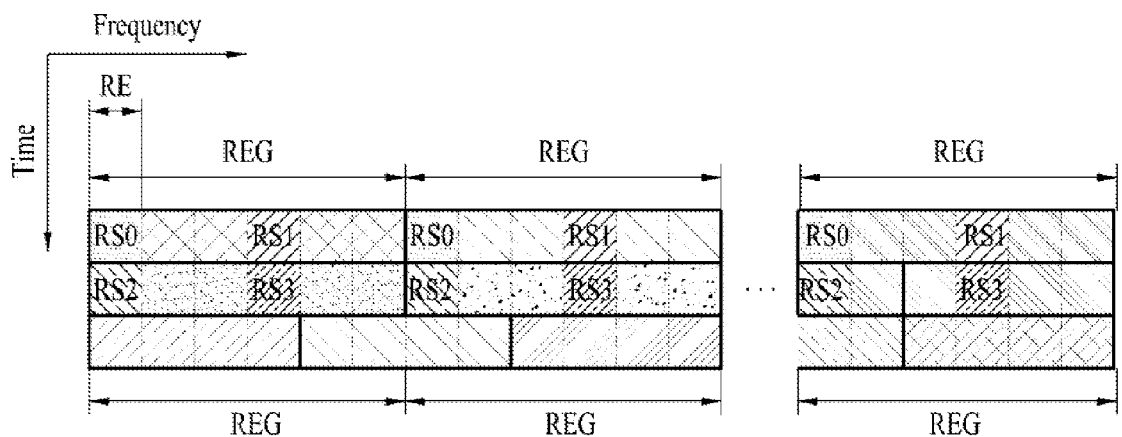

FIG. 5 and FIG. 6 indicate that the aforementioned DL control channels are assigned by a resource element group (REG) unit in a control region of each subframe. FIG. 5 is a diagram for one example of a resource configuration of a DL control channel in a system having 1 or 2 transmitting (Tx) antennas. And, FIG. 6 is a diagram for one example of a resource configuration of a DL control channel in a system having 4 transmitting (Tx) antennas. As depicted in FIG. 5 and FIG. 6, an REG, which is a basic unit to which a control channel is assigned, may include 4 contiguous resource elements in frequency domain except a resource element to which a reference signal is allocated. The specific number of REGs can be used to transmit a DL control channel in accordance with an overhead of the DL control channel.

PCFICH (Physical Control Format Indicator Channel)

PDCCH can be transmitted between an OFDM symbol index 0 and 2 in each subframe to provide resource allocation information of each subframe. Depending on overhead of a control channel, OFDM symbol index 0, OFDM symbol index 0 and 1, or OFDM symbol index 0 to 2 can be used. As mentioned in the foregoing description, the number of OFDM symbols used by the DL control channel is changeable, of which information is indicated by the PCFICH. Therefore, the PCFICH should be transmitted in each subframe.

3 kinds of information can be provided by the PCFICH. Table 1 indicates a CFI (control format indicator) of the PCFICH. A CFI value set to 1 indicates that PDCCH is transmitted on OFDM symbol index 0, a CFI value set to 2 indicates that PDCCH is transmitted on OFDM symbol index 0 and 1, and a CR value set to 3 indicates that PDCCH is transmitted on OFDM symbol index 0 to 2.

[Table 1]

Information transmitted on PCFICH can be differently defined according to a system bandwidth. For instance, if a system bandwidth is less than a specific threshold, the CFI value set to 1, 2, and 3 may indicate that 2, 3, and 4 OFDM symbols are used for PDCCH, respectively.

Figure 7:
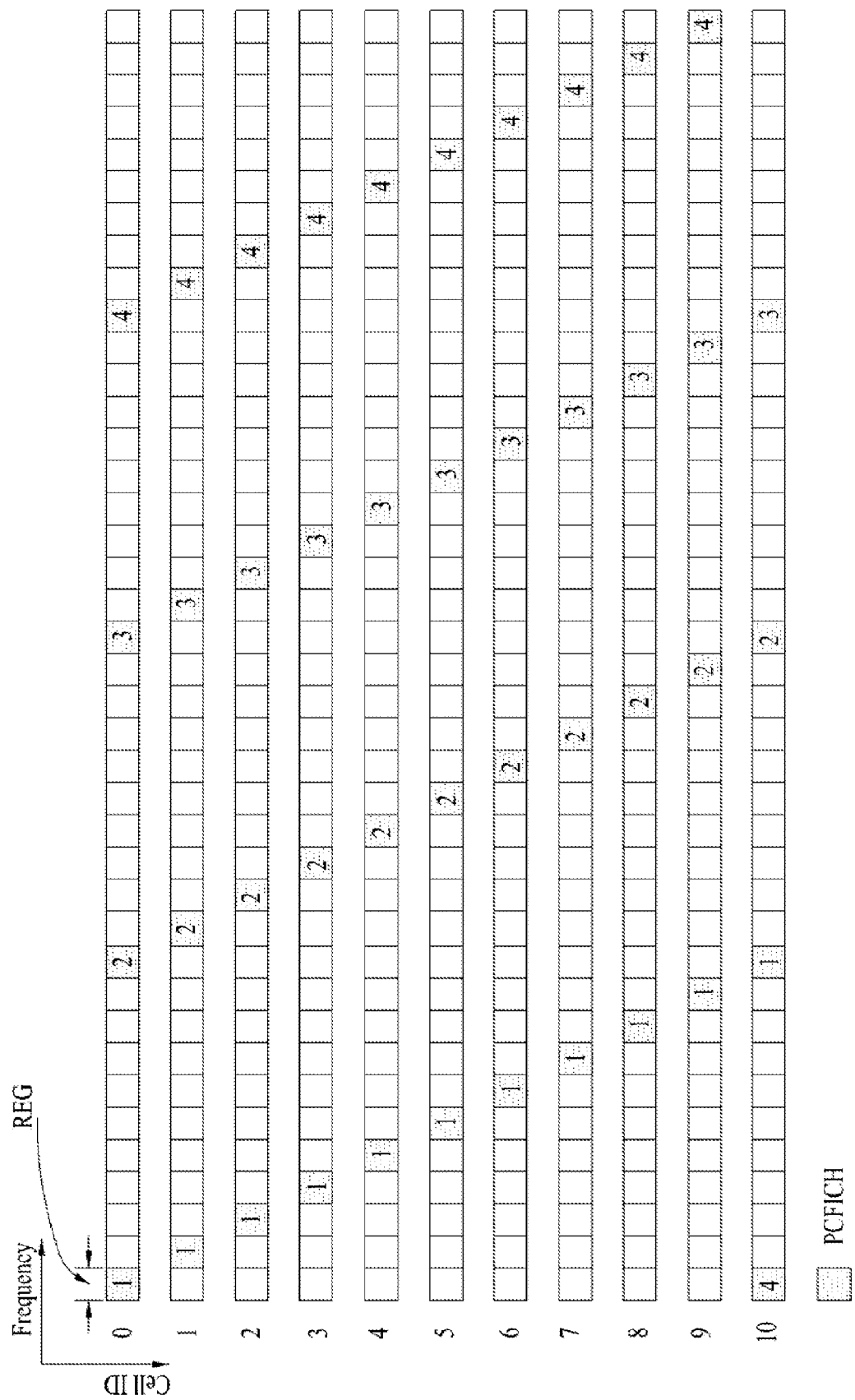
FIG. 7 is a diagram for a type of transmitting a physical control format indicator channel (PCFICH)

FIG. 7 is a diagram for a type of transmitting a physical control format indicator channel (PCFICH). Referring to FIG. 7, REG includes 4 subcarriers, and more particularly, data subcarriers except a reference signal. In general, a transmit diversity scheme can be applied to the REG. In order to prevent inter-cell interference, the REG may be shifted in frequency domain in every cell, i.e., in accordance with a cell ID. In addition, since the PCFICH is transmitted on a first OFDM symbol (OFDM symbol index 0) of a subframe all the time, if a receiver receives the subframe, the receiver preferentially checks information of the PCFICH, identifies the number of OFDM symbols to which PDCCH is transmitted, and then receives control information transmitted on the PDCCH.

PHICH (Physical Hybrid-ARQ Indicator Channel)

Figure 8:
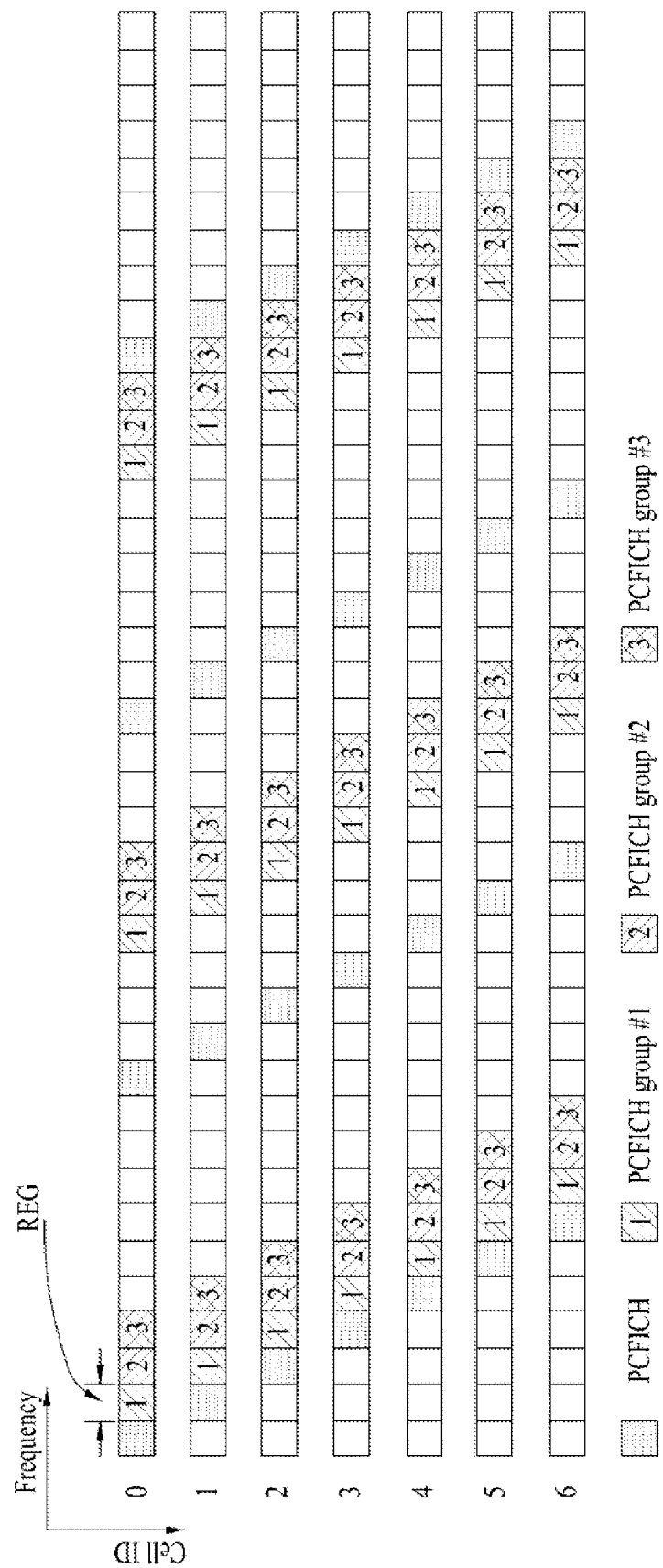
FIG. 8 is a diagram for a position of a PCFICH and a position of a physical HARQ indicator channel (PHICH)

FIG. 8 is a diagram for a position of a PCFICH and a position of a physical HARQ indicator channel (PHICH) generally applied in a specific bandwidth. First of all, PHICH is a channel that carries ACK/NACK information on a DL data transmission. Pluralities of PHICH groups are formed in one subframe and pluralities of PHICHs exist in one PHICH group. Hence, one PHICH group may include PHICHs for a plurality of user equipments.

As depicted in FIG. 8, PHICH allocation for each user equipment in several PHICH groups is performed using a lowest PRB (physical resource block) index of a PUSCH resource allocation and a cyclic shift index for a demodulation reference signal (DMRS) transmitted on an uplink grant PDCCH. The DMRS is a UL reference signal provided together with UL transmission to perform channel estimation for a UL data demodulation. The PHICH resource is known as such an index pair as. In this case, and in the index pair indicate a PHICH group number and an orthogonal sequence index in the corresponding PHICH group, respectively. The above-mentioned and may be defined by Formula 1 in the following.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH} \quad \text{[Formula 1]}$$

In Formula 1, indicates a cyclic shift of DMRS used for a UL transmission related to PHICH and is mapped to a value of a 'cyclic shift for DMRS' field of a latest UL grant control information (e.g., DCI format 0 or 4) on a transport block (TB) related to corresponding PUSCH transmission. For instance, the 'cyclic shift for DMRS' field of the latest UL grant DCI format may have a size of 3-bit. If this field has a value of '000', can be configured to have a value of '0'.

In Formula 1, indicates a size of a spreading factor used for PHICH modulation. indicates a lowest PRB index in a first slot used for corresponding PUSCH transmission. $I_{PHICH}$ has a value of '1' on a special case (UL/DL configuration is set to '0' and PUSCH is transmitted in 4$^{th}$ or 9$^{th}$ subframe) in a TDD system. Otherwise, $I_{PHICH}$ has a value of '0'. indicates the number of PHICH group(s) configured by an upper layer and can be defined by Formula 2 in the following.

[Formula 2]

In Formula 2, indicates information on a size of PHICH resource transmitted on PBCH (Physical Broadcast Channel). has a size of 2-bit and is represented as ( ). In Formula 2, indicates the number of resource block(s) configured in DL.

Table 2 shows one example of an orthogonal sequence defined by a legacy 3GPP LTE release 8/9.

TABLE 2

| Sequence index $n_{PHICH}^{seq}$ | Orthogonal sequence Normal cyclic prefix $N_{SF}^{PHICH} = 4$ | Extended cyclic prefix $N_{SF}^{PHICH} = 2$ |
|---|---|---|
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 9:
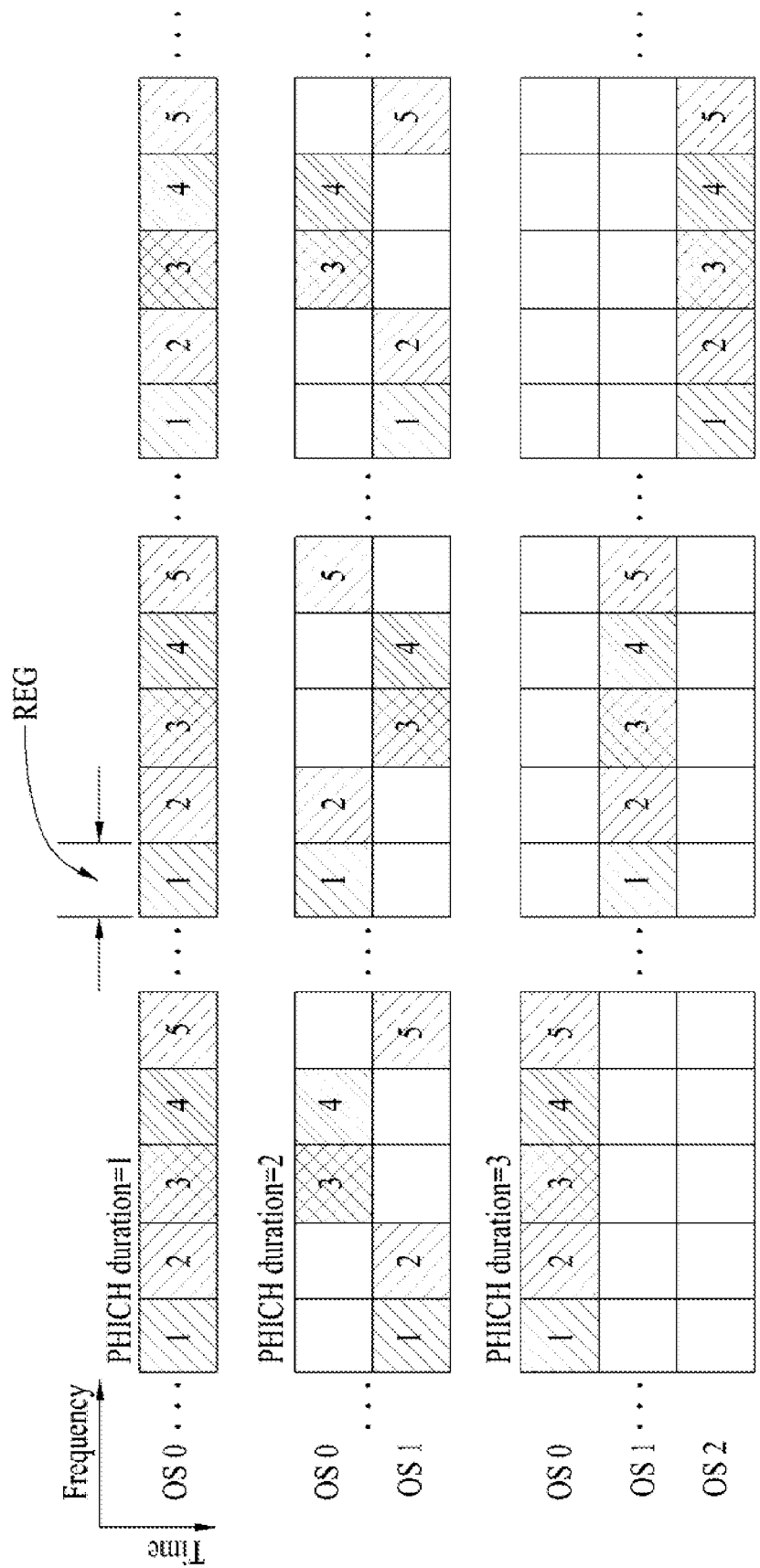
FIG. 9 is a diagram for a position of a downlink resource element to which a PHICH group is mapped.

FIG. 9 is a diagram for a position of a downlink resource element to which a PHICH group is mapped. As depicted in FIG. 9, the PHICH group can be configured on a different time domain (i.e., different OS (OFDM symbol)) within one subframe according to PHICH duration.

A PHICH resource is explained in more detail. The PHICH resource is defined by an index pair consisting of a group index and an orthogonal sequence index. One group is consisting of 12 REs and managed by a reserved form. In particular, a PHICH group occupies a whole band in a control region of a subframe and a PHICH group index is allocated to the PHICH resource situating at the whole band using a lowest PRB index of a TB of a first slot of PUSCH transmitted by a user equipment. As mentioned in the foregoing description, since a resource allocated on PHICH is used by a reserved form, resource waste occurs. In order to avoid the PHICH resource waste and efficiently manage the resource, i) the PHICH resource may be UE-specifically allocated (for instance, an ePHICH resource may be UE-specifically allocated in case of introducing ePHICH (enhanced PHICH) transmitting PHICH in a PDSCH region) or ii) PHICH may not be transmitted. In case of ii), it is necessary to determine how to transmit a reception confirmation response (ACK/NACK) of PUSCH, which is used to be transmitted on legacy PHICH. The present invention proposes to transmit the reception confirmation response (ACK/NACK) of PUSCH in a PDCCH region via a new field of uplink grant DCI. Or, the present invention proposes that NDI among fields included in a DCI format (e.g., DCI format 0 and 4) related to the uplink grant performs a role of PHICH.

In the following, a method of performing an uplink HARQ procedure using NDI only without transmitting PHICH is described in detail.

When reception confirmation response information on uplink data, which is transmitted by a user equipment on PUSCH, is transmitted via NDI of an uplink grant DCI format, it is necessary for the user equipment to identify whether the uplink grant DCI format received by the user equipment corresponds to an uplink grant DCI format 0, 4 in LTE/LTE-A system or a DCI format 0, 4 including NDI for uplink data transmission in case of not transmitting PHICH. Hence, if a DCI format satisfies a prescribed condition, it is able to make the user equipment consider a DCI format received by the user equipment as a reception confirmation response for uplink data transmitted by the user equipment.

If the DCI format received by the user equipment satisfies a prescribed condition (in case of a DCI format including NDI, which is related to the reception confirmation response for the uplink data transmission) and if the NDI is toggled, it may be configured as indication of ACK for the uplink data.

If the DCI format received by the user equipment satisfies a prescribed condition (in case of a DCI format including NDI, which is related to the reception confirmation response for the uplink data transmission) and if the NDI is not toggled, it may be configured as indication of NACK for the uplink data. In this case, the user equipment can perform an adaptive retransmission or a non-adaptive retransmission according to upper link signaling/configuration. When the user equipment should perform the non-adaptive retransmission, the user equipment can retransmit the uplink data after checking that the NDI is not toggled. Or, when the user equipment should perform the adaptive retransmission, the user equipment checks that the NDI is not toggled and may be then able to further receive an uplink grant DCI format transmitted to the user equipment to check a resource used for retransmitting the uplink data.

Figure 10:
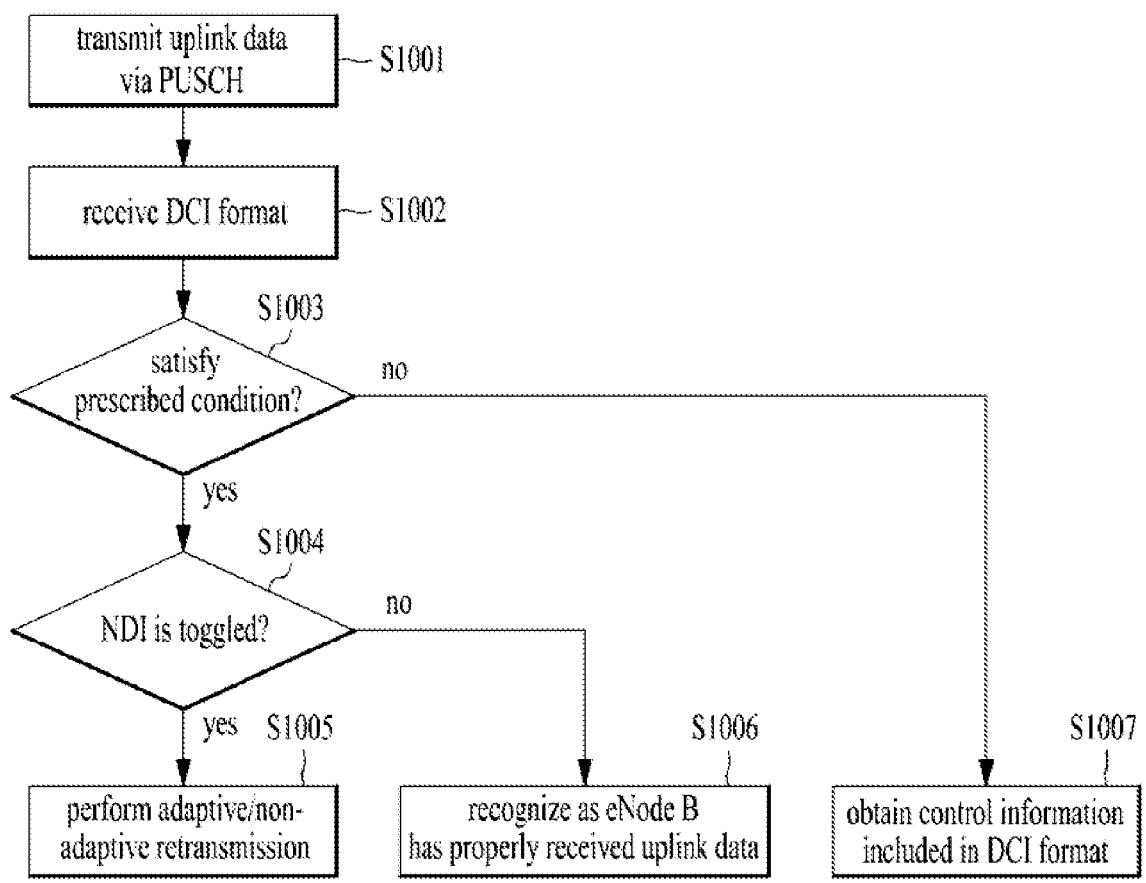
FIG. 10 is a diagram for explaining an operation of a user equipment according to embodiment of the present invention.

FIG. 10 shows operations of a user equipment in relation to the aforementioned contents. Referring to FIG. 10, in the step S1001, the user equipment transmits uplink data via PUSCH. In the step S1002, the user equipment receives a DCI format 0 or 4. In this case, timing of receiving the DCI format received by the user equipment can be configured by a subframe followed by 4 subframes after the uplink data is transmitted and the like in advance. In case of a TDD system, timing of receiving a DCI format can be configured in advance according to a subframe in which PUSCH is transmitted by the user equipment, TDD UL/DL configuration and the like. In the step S1003, the user equipment determines whether the DCI format satisfies a prescribed condition. If the prescribed condition is satisfied, the user equipment checks whether NDI is toggled in the step S1004. If the NDI is toggled, the user equipment performs adaptive/non-adaptive retransmission in the step S1005. If the NDI is not toggled, the user equipment recognizes that the uplink data is properly received by a base station in the step S1006 and does not perform retransmission. In the step S1003, if the prescribed condition is not satisfied, the user equipment obtains control information included in the received DCI format in the step S1007.

In the aforementioned description, when PHICH is not transmitted, a prescribed condition making the DCI format received by the user equipment to be considered as a reception confirmation response for the uplink data received by the user equipment may correspond to i) disable of a transport block, ii) one or more field values of the received DCI format are matched with a predetermined value, iii) a new DCI format and the like. In the following, each of the prescribed conditions is explained in detail according to embodiment.

Embodiment 1

If it is indicated that the DCI format detected by the user equipment disables a transport block for PUSCH, the user equipment can configure the received DCI format to be considered as a format delivering ACK/NACK information of PUSCH, which is transmitted by the user equipment via NDI, instead of a format transmitting the PUSCH.

When the user equipment detects a DCI format 0 or 4, an example for a method of disabling a transport block may include a case that a 'modulation and coding scheme and redundancy version' field $I_{MCS}$ corresponds to 29, there is a single serving cell, the number of allocated PRB $N_{PRB} \leq 4$ (if there are two serving cells, $N_{PRB} \leq 20$) and an aperiodic CSI report is triggered.

Or, when the user equipment detects the DCI format 4, the method of disabling a transport block may include a case that $I_{MCS}=0$ and $N_{PRB}>1$ or a case that $I_{MCS}=28$ and $N_{PRB}=1$.

Or, when the user equipment detects the DCI format 0, the method of disabling a transport block may include a case that $I_{MCS}=0$ and $N_{PRB}>1$ or a case that $I_{MCS}=28$ and $N_{PRB}=1$.

Besides, $I_{MCS}$, $N_{PRB}$ or a specific field of a DCI format can be configured by a value disabling a transport block. If the aforementioned condition is satisfied, the DCI format can deliver a reception confirmation response for the uplink data transmitted by the user equipment via NDI.

As mentioned in the foregoing description, if it is checked that the transport block for PUSCH is disabled via $I_{MCS}$, $N_{PRB}$ or the like, the user equipment can determine whether to retransmit in a manner of checking NDI of a corresponding DCI format. Detail explanation on this is replaced with what is explained in the foregoing description.

Embodiment 2-1

If a user equipment descrambles a CRC parity bit for a DCI format payload with C-RNTI and values of one or more specific fields are matched with a predetermined value, a DCI format can be configured to be recognized as a format for the use of HARQ instead of a format for the use of scheduling PUSCH transmitted by the user equipment.

For instance, if a value of a specific field of DCI format 0 is matched with configuration of following Table 3, the corresponding DCI format can be configured as a DCI format including NDI, which is related to a reception confirmation response for uplink data transmission.

TABLE 3

| Field | DCI format 0 |
| --- | --- |
| TPC command for scheduled PUSCH | set to '00' |
| Cyclic shift DM RS | set to '000' |
| Modulation and coding scheme and redundancy version | MSB is set to '0' |
| HARQ number | N/A |
| Modulation and coding scheme | N/A |
| Redundancy version | N/A |

According to a DCI format 4, two transport blocks can inform the user equipment of ACK/NACK information on PUSCH transmitted by the user equipment using an NDI field for each of the two transport blocks.

For instance, if a value of a specific field of the DCI format 4 is matched with configuration of following Table 3, the corresponding DCI format can be configured as a DCI format including NDI, which is related to a reception confirmation response for uplink data transmission.

TABLE 4

| Field | DCI format 4 |
| --- | --- |
| TPC command for scheduled PUSCH | set to '00' |
| Cyclic shift DM RS | set to '000' |
| Modulation and coding scheme and redundancy version for Transport block 1 | MSB is set to '0' |
| Modulation and coding scheme and redundancy version for Transport block 2 | MSB is set to '0' |
| HARQ number | N/A |
| Modulation and coding scheme | N/A |
| Redundancy version | N/A |

If values of one or more specific fields of a DCI format received by the user equipment are matched with a predetermined value and NDI is toggled, the DCI format can be configured as a format indicating ACK for uplink data. In this case, the user equipment does not need to perform retransmission.

If values of one or more specific fields of a DCI format received by the user equipment are matched with a predetermined value and NDI is not toggled, the DCI format can be configured as a format indicating NACK for uplink data. In this case, the user equipment can perform adaptive retransmission or non-adaptive retransmission according to upper layer signaling/configuration. In order for the user equipment to perform the adaptive retransmission, the user equipment can retransmit the uplink data after checking that the NDI is not toggled. Or, in order for the user equipment to perform the non-adaptive retransmission, the user equipment can further receive an uplink grant DCI format transmitted to the user equipment to check a resource used for retransmitting the uplink data after checking that the NDI is not toggled.

Embodiment 2-2

If a user equipment detects a DCI format in which a CRC parity bit for a DCI format payload is scrambled by an RNTI (e.g., SPS-RNTI) instead of a C-RNTI and values of one or more specific fields are matched with a predetermined value, the DCI format can be configured to be recognized as a format for the use of HARQ instead of a format for the use of scheduling PUSCH transmitted by the user equipment.

If a NDI value of the received DCI format is toggled, the user equipment considers it as a base station has properly received the PUSCH and does not perform retransmission. If the NDI value is not toggled, the user equipment considers it as the base station has not properly received the PUSCH and can perform adaptive/non-adaptive retransmission.

As a different example, in case of an SPS active/release, the NDI value can be configured by '0'. And, if the DCI format is configured for the use of HARQ instead of the use of scheduling PUSCH transmission, the NDI value can be configured by '1'. In this case, whether to retransmit the PUSCH can be indicated in a manner of defining a value of a special field of the DCI format payload in advance. In particular, instead of informing ACK/NACK information of the PUSCH transmitted by the user equipment by the NDI value, the ACK/NACK information can be informed by the value of the special field of a predetermined DCI format. For instance, when the user equipment detects a DCI format 0 in which the CRC parity bit for the DCI format payload is scrambled by the SPS-RNTI, if the NDI value of the received DCI format corresponds to '0' and a value of a field of the received DCI format payload is identical to a value for a predetermined SPS active message, the user equipment recognizes it as the user equipment has received the SPS active message from a base station.

Since the NDI fixedly uses '1' and '0' in case that the NDI is used for the use of HARQ and the use of SPS active/release, respectively, in order to inform that a base station has properly received the PUSCH, it is necessary to use a value of the NDI of '1' and a special field value, which is different from a value of the case of SPS active/release, should be defined. For instance, when the user equipment detects the DCI format 0 in which a CRC parity bit for a DCI format payload is scrambled by an SPS-RNTI, if the NDI value of the received DCI format corresponds to '1' and a value of a field of the received DCI format payload is identical to a value shown in Table 5, the user equipment considers it as the base station has properly received the PUSCH transmitted by the user equipment and does not perform retransmission. And, when the user equipment detects the DCI format 0 in which a CRC parity bit for a DCI format payload is scrambled by an SPS-RNTI, if the NDI value of the received DCI format corresponds to '1' and a value of a field of the received DCI format payload is identical to a value shown in Table 6, the user equipment can retransmit uplink data previously transmitted by the user equipment. Or, in order for the user equipment to perform non-adaptive retransmission, the user equipment can further receive an uplink grant DCI format transmitted to the user equipment to check a resource used for retransmitting the uplink data.

TABLE 5

| Field | DCI format 0 |
| --- | --- |
| TPC command for scheduled PUSCH | set to '00' |
| Cyclic shift DM RS | set to '111' |
| Modulation and coding scheme and redundancy version | MSB is set to '0' |
| HARQ number | N/A |
| Modulation and coding scheme | N/A |
| Redundancy version | N/A |

TABLE 6

| Field | DCI format 0 |
| --- | --- |
| TPC command for scheduled PUSCH | set to '00' |
| Cyclic shift DM RS | set to '010' |
| Modulation and coding scheme and redundancy version | MSB is set to '0' |

TABLE 6-continued

| Field | DCI format 0 |
| --- | --- |
| HARQ number | N/A |
| Modulation and coding scheme | N/A |
| Redundancy version | N/A |

Subsequently, when the user equipment detects a DCI format 4, if a CRC parity bit of a received DCI payload is scrambled by an SPS-RNTI and a value of a specific field is configured by a predetermined value, the user equipment can consider it as a received DCI format is used for HARQ only instead of informing configuration of PUSCH to be transmitted by the user equipment. In this case, a value of a 'modulation and coding scheme and redundancy version' field of a transport block 1 for the PUSCH and a value of a 'modulation and coding scheme and redundancy version' field of a transport block 2 for the PUSCH can be configured in a manner of being independent from each other. And, the received DCI format may correspond to a DCI format allocated for the two transport blocks for the use of HARQ according to the value of the field. Or, the received DCI format may correspond to a DCI format allocated for a single transport block for the use of HARQ. Since the NDI fixedly uses '1' and '0' in case that the NDI is used for the use of HARQ and the use of SPS active/release, respectively, in order to inform that a base station has properly received the PUSCH, it is necessary to use a value of the NDI of '1' and a special field value, which is different from a value of the case of SPS active/release, should be defined. For instance, when the user equipment detects the DCI format 0 in which a CRC parity bit for a DCI format payload is scrambled by an SPS-RNTI, if the NDI value of the received DCI format corresponds to '1' and a value of a field of the received DCI format payload is identical to a value shown in Table 7, the user equipment considers it as the base station has properly received the PUSCH transmitted by the user equipment and does not perform retransmission. And, a field value of a DCI payload indicating that the base station has not properly received the PUSCH transmitted by the user equipment can be defined in advance using a method similar to the aforementioned method.

TABLE 7

| Field | DCI format 4 |
| --- | --- |
| TPC command for scheduled PUSCH | set to '00' |
| Cyclic shift DM RS | set to '111' |
| Modulation and coding scheme and redundancy version for Transport block 1 | MSB is set to '0' |
| Modulation and coding scheme and redundancy version for Transport block 2 | MSB is set to '0' |
| HARQ number | N/A |
| Modulation and coding scheme | N/A |
| Redundancy version | N/A |

Embodiment 3

A new DCI format is defined and UL HARQ can be managed using the newly defined DCI format. In this case, overhead can be reduced in a manner of excluding unnecessary fields ('resource allocation', 'resources block assignment' and the like) from the newly defined DCI format except NDI. For instance, a DCI format 0 can be configured as shown in Table 7 in the following.

TABLE 7

Modulation and coding scheme and redundancy version
NDI
TPC command for scheduled PUSCH
Cyclic shift DM RS
(Carrier indicator)
(UL index)
(DAI)

Referring to a parenthesis part of Table 7, in case of using carrier aggregation, a 'carrier indicator' field can be additionally transmitted in a cell instead of Pcell. And, in case of TDD, a 'DAI' field and a 'UL index' field can be included.

For a DCI format 4, a compact DCI format can be configured according to the aforementioned method.

In case of configuring the compact DCI format according to the aforementioned method, blind decoding can be performed for the compact DCI format in a common search space or a UE-specific search space. In case of transmitting the compact DCI format in the UE-specific search space, user equipments can determine whether to perform the blind decoding on the compact DCI format according to a defined transmission mode.

The method proposed by the present invention is also applicable to a case to which CA is applied and a case of performing a D2D (device to device) communication. Moreover, the method is applicable to a communication after LTE as well.

Figure 11:
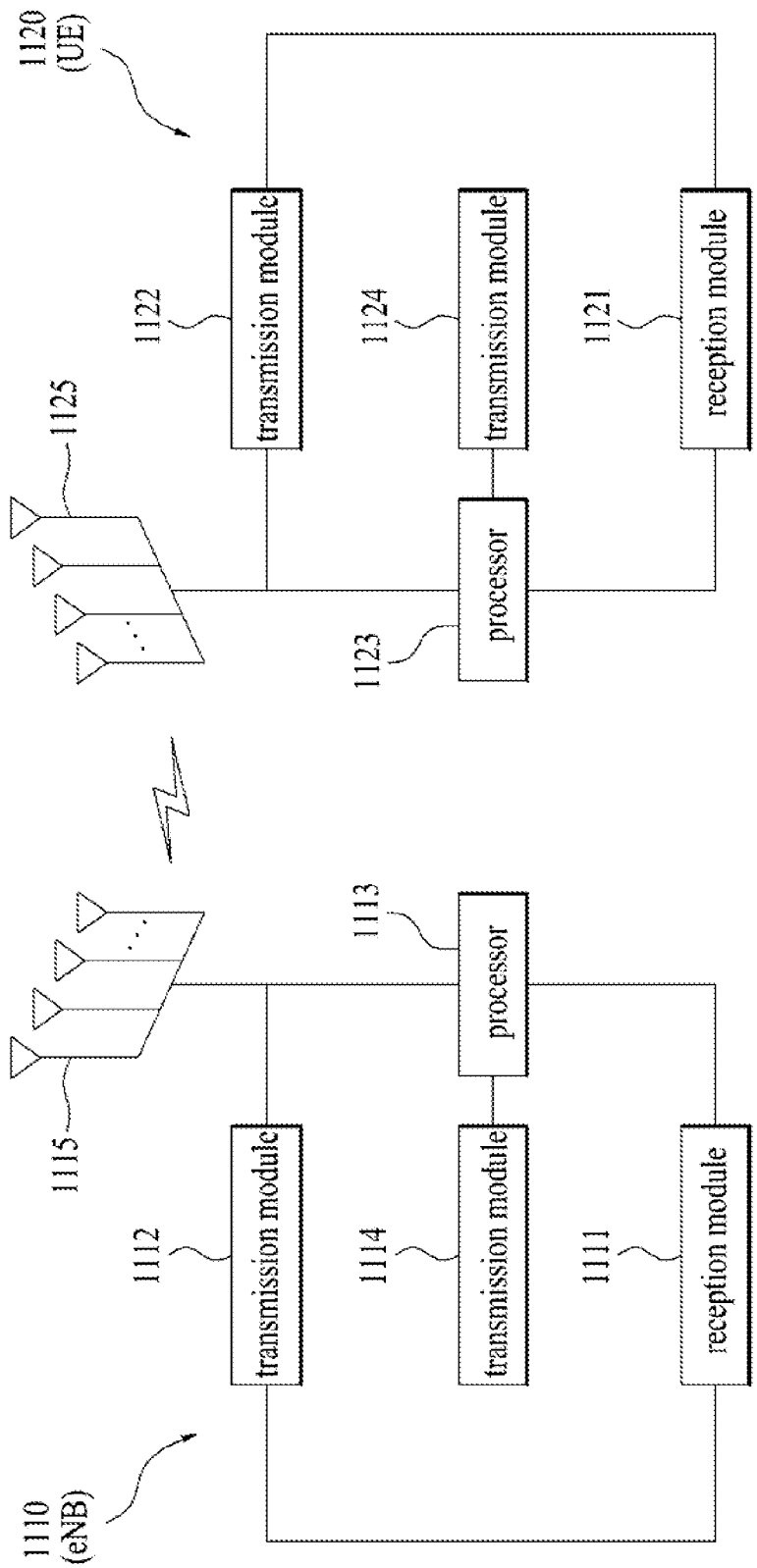
FIG. 11 is a diagram for a configuration of an eNode B and a user equipment according to embodiment of the present invention.

FIG. 11 is a diagram for a configuration of an eNode B and a user equipment according to the present invention.

Referring to FIG. 11, the eNode B 1110 according to the present invention includes a reception module 1111, a transmission module 1112, a processor 1113, a memory 1114, and a plurality of antennas 1115. A plurality of the antennas 1115 means the eNode B capable of supporting MIMO transmission and reception. The reception module 1111 can receive various signals, a data, and information in UL from the UE. The transmission module 1112 can transmit various signals, a data, and information in DL to the UE. The processor 1113 can control overall operations of the eNode B 1110 and can operate to implement the aforementioned embodiment of the present invention.

Besides, the processor 1113 of the eNode B 1110 is configured to perform a function of processing information received by the eNode B 1110, information to be transmitted to an external, and the like. The memory 1114 is configured to store the processed information for a prescribed time and can be substituted by such a configuration element as a buffer (not depicted), or the like. Subsequently, referring to FIG. 11, the UE 1120 according to the present invention includes a reception module 1121, a transmission module 1122, a processor 1123, a memory 1124, and a plurality of antennas 1125. A plurality of the antennas 1125 means the UE capable of supporting MIMO transmission and reception. The reception module 1121 can receive various signals, a data, and information in DL from the eNode B. The transmission module 1122 can transmit various signals, a data, and information in UL to the eNode B. The processor 1123 can control overall operations of the UE 1120 and can operate to implement the aforementioned embodiment of the present invention.

Besides, the processor 1123 of the UE 1120 is configured to perform a function of processing information received by the UE 1120, information to be transmitted to an external, and the like. The memory 1124 is configured to store the processed information for a prescribed time and can be substituted by such a configuration element as a buffer (not depicted), or the like.

Detail configuration of the eNode B and the UE can be implemented to independently apply the aforementioned contents explained in various embodiments of the present invention or to simultaneously apply two or more embodiments. The overlapped contents are omitted for clarity of explanation.

And, in explaining FIG. 11, explanation on the eNode B 1110 can be identically applied to a device as a main agent of DL transmission or a main agent of UL reception. Explanation on the UE 1120 can be identically applied to a relay as a main agent of DL reception or a main agent of UL transmission.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like. In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

INDUSTRIAL APPLICABILITY

Although the aforementioned explanation describes the present invention in a manner of mainly concerning a form applied to a 3GPP LTE mobile communication system, the present invention can be used for various kinds of mobile communication systems with an identical or an equivalent principle.

What is claimed is:

1. A method of receiving control information, which is received by a user equipment in a wireless communication system, comprising the steps of:
    transmitting uplink data to an eNode B via a physical uplink shared channel; and
    receiving a downlink control information (DCI) format related to an uplink grant;
    wherein if a new data indicator (NDI) of the DCI format is set to a first one of two values, the user equipment considers the DCI format as a reception confirmation response of the uplink data,
    wherein the NDI set to the first value indicates that the DCI format is configured to provide the reception confirmation response of the uplink data, and the NDI set to the second value indicates that the DCI format is configured for semi-persistent scheduling (SPS) active/release, and
    wherein if the NDI is set to the first value, the user equipment determines whether the reception confirmation response of the uplink data is ACK information or NACK information according to values of one or more fields of the DCI format, without receiving a physical HARQ (hybrid automatic retransmit request) indicator channel from the eNode B.

2. The method of claim 1, wherein the one or more fields comprise a transmit power control command field, a demodulation reference signal cyclic shift field and a modulation and coding-related field.

3. The method of claim 1, wherein the DCI format is descrambled by an SPS (semi persistence scheduling)-RNTI.

4. The method of claim 1, wherein the user equipment descrambles the DCI format with a prescribed RNTI in a subframe followed by 4 subframes from a subframe in which the uplink data is transmitted.

5. The method of claim 1, wherein if the NDI is set to the first value and the value of one or more fields of the DCI format are matched with a first predetermined value, the user equipment retransmits the uplink data.

6. The method of claim 1, wherein if the NDI is set to the first value and the value of one or more fields of the DCI format are matched with a first predetermined value, the user equipment further receives the DCI format to retransmit the uplink data.

7. The method of claim 1, wherein if the NDI is set to the first value and the value of one or more fields of the DCI format are matched with a second predetermined value, the user equipment does not perform transmission transmitted by a resource block allocation field of the DCI format.

8. A user equipment device in a wireless communication system, comprising:
    a reception module; and
    a processor,
    the processor configured to transmit uplink data to an eNode B via a physical uplink shared channel, the processor configured to receive a downlink control information (DCI) format related to an uplink grant,
    wherein if a new data indicator (NDI) of the DCI format is sets to a first one of two values, the user equipment considers the DCI format as a reception confirmation response of the uplink data,
    wherein the NDI set to the first value indicates that the DCI format is configured to provide the reception confirmation response of the uplink data, and the NDI set to the second value indicates that the DCI format is configured for semi-persistent scheduling (SPS) active/release, and
    wherein if the NDI is set to the first value, the user equipment determines whether the reception confirmation response of the uplink data is ACK information or NACK information according to values of one or more fields of the DCI format, without receiving a physical HARQ (hybrid automatic retransmit request) indicator channel from the eNode B.

* * * * *